H. G. CORDLEY.
FAUCET.
APPLICATION FILED APR. 22, 1909.
1,015,614.
Patented Jan. 23, 1912.
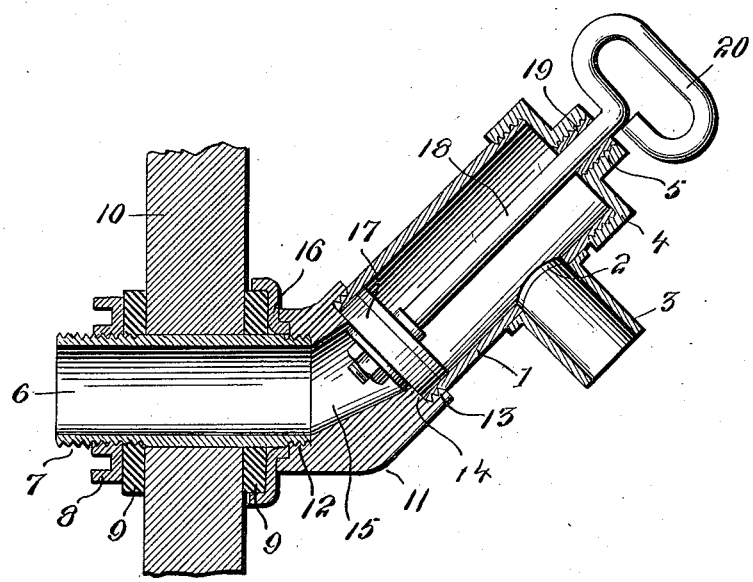
WITNESSES
INVENTOR
Henry G. Cordley
BY
Attorney

UNITED STATES PATENT OFFICE.

HENRY GREELEY CORDLEY, OF GLEN RIDGE, NEW JERSEY.

FAUCET.

1,015,614.  Specification of Letters Patent.  Patented Jan. 23, 1912.

Application filed April 22, 1909. Serial No. 491,616.

*To all whom it may concern:*

Be it known that I, HENRY G. CORDLEY, a citizen of the United States, residing at Glen Ridge, in the county of Essex, State of New Jersey, have invented certain new and useful Improvements in Faucets, of which the following is a description, reference being had to the accompanying drawings, forming a part hereof.

My invention relates to improvements in faucets or valves designed to control the flow of water or other liquid from a receptacle, and my improved faucet is designed with special reference to use with water coolers to control the flow of water therefrom.

The object of my invention is to provide a faucet or valve for the purpose above specified which shall be pleasing and attractive in appearance, which may be easily and cheaply manufactured by improved mechanical processes and largely from the materials which may be readily purchased in the open market, which is of simple construction, which may be easily repaired in case its operative parts become worn so as to be unserviceable, which will be effective for the purpose for which it is designed, and in which certain disadvantages heretofore often present in faucets when used with water coolers are avoided.

With the above mentioned objects in view, my invention consists in the improved faucet illustrated in the accompanying drawing, described in the following specification, and particularly claimed in the clauses of the concluding claim.

In the drawing, the view presented shows my improved faucet mainly in section.

Referring to the drawing, 1 is the body portion of my improved faucet, and is preferably formed from a piece of metal tubing which may be readily purchased in the open market. This body portion is provided with an opening at 2 about which a discharge spout 3 is secured as by soldering it to the body portion 1. The body portion is threaded at its outer end to receive a cap 4, which cap is provided with a central threaded opening at 5. 6 is a nipple which may also be formed from a piece of metallic tubing and which is threaded at 7 to receive a nut 8, and 9 are washers of rubber or similar material to serve as packing when the faucet is secured to a receptacle by means of the nut 8 in a manner which will be obvious, a portion of the wall of such a receptacle being shown at 10.

11 is a coupling member interposed between the nipple 6 and the body portion 1 of the faucet and having threaded recesses within which the threaded ends of said members are secured, as shown at 12, 13; and this coupling member is also provided with a ledge at 14 surrounding the passage 15 extending therethrough, and which ledge forms a valve seat for the valve of my improved faucet. The recesses aforesaid are disposed at an angle to one another so that the axes of the nipple 6 and body portion 1 will intersect at an angle when said members are secured within their respective recesses, and so that when the faucet is in place the body portion 1 will be inclined upwardly and will stand at an angle with reference to the vertical wall of the receptacle with which the faucet is used, as will be understood from the drawing.

16 is a flange surrounding the nipple 6 and serving as a seat for the outer washer 9. This flange rests against the inner end of the coupling member 11; and the joint between the coupling member 11, nipple 6 and flange 16 will preferably be filled with solder after the parts are properly assembled to thereby secure the parts together into a single unitary structure.

17 is the valve of my faucet, which valve seats upon the seat 14 above mentioned and is secured to a valve operating rod or stem 18 formed preferably from wire, by means of a nut and washers as shown. A threaded sleeve 19 is secured upon the outer portion of the operating rod 18 as by being soldered thereto, the threads of which sleeve engage with the threaded opening 5 in the cap 4. The outer end of the rod 18 is bent to form a handle 20 whereby the valve may be operated. The threaded sleeve 19 will be seen to be considerably larger in diameter than the valve stem 18, whereby after the sleeve is disengaged from the threaded opening in the cap 4 the stem 18 may be readily moved longitudinally to move the valve 17 away from the seat 14.

The valve 17 is made substantially the same in diameter as the interior of the casing 1, so that after the threaded sleeve 19 has been disengaged from the threaded opening 5 the valve will have to be moved to a considerable distance from its seat and past the opening 2 before any considerable flow can take place through the faucet. This, however, is an advantage as a more tightly fitting valve and one less likely to leak is thereby procured; and the valve may be very quickly and conveniently operated as the threaded sleeve 19 is comparatively short so that but a few turns of the handle 20 are required to disengage the sleeve from the threaded opening 5 and permit the valve to be moved longitudinally as aforesaid.

By providing a body portion inclined upwardly as disclosed a faucet is procured in which dripping after the valve is closed is avoided. In faucets the inner surface is wetted when liquid flows through them, and, with horizontally extending faucets with a spout upon their lower side such as are commonly used with water coolers, this small quantity of water adherent upon the interior of the faucet will run down and drip from the spout, not for any considerable time but to the extent of several drops, which is an annoyance objected to by users. With the body of the faucet inclined this dripping is avoided, and the water which would in horizontal faucets run out the spout is retained within the body of the faucet over the valve thereof, and thus furthermore and incidentally serves to keep the valve moist and in good order. A further advantage gained by inclining the faucet is that water formed by condensation from the vapor in the surrounding atmosphere, which is a phenomenon ordinarily present in water coolers, will run down the body of the faucet and to the outer wall of the cooler and into a suitable drip pan commonly provided, whereas were the faucet horizontal this water of condensation would drop from the faucet as a continual drip to the annoyance of the user.

Having thus described my invention and explained the mode of operation thereof, I claim and desire to secure by Letters Patent:

1. In a faucet, a nipple adapted to extend through the wall of a receptacle to thus form a support for a faucet; a body portion; a coupling member interposed between said nipple and said body portion and provided with two recesses disposed at an angle with one another wherein the ends of said nipple and of said body portion are secured, and whereby said body portion may be supported in a position inclining upward from its point of support, and provided also with a valve seat; a valve coöperating with said seat; and a stem for operating said valve, said stem being within and extending longitudinally of said body portion and said body portion having a discharge opening above the level of said valve seat.

2. In a faucet, a nipple adapted to extend through the wall of a receptacle to thereby support the faucet; a body portion; a coupling member interposed between said nipple and said body portion and provided with two recesses disposed at an angle to one another wherein the ends of said nipple and of said body portion are secured, and whereby said body portion will be supported in a position inclining upwardly from its point of support, and provided also with a valve seat formed by the bottom wall of that recess wherein the end of said body member is secured; a valve coöperating with said seat; and means for operating said valve.

3. In a faucet, a body portion; a valve seat; a valve within said body portion and capable of movement longitudinally thereof and adapted to engage said valve seat; a rod to which said valve is secured and by which it may be operated; a cap upon the outer end of said body portion and having a threaded opening of greater diameter than said rod; a threaded member upon the outer end of said rod and adapted to engage the threaded opening in said cap when the valve is closed, and to be out of engagement with said threaded opening when the valve is opened to its greatest extent, and a discharge spout intermediate said valve seat and said cap, the distance from said valve seat to said discharge spout being greater than the length of said threaded member whereby said valve after having been disengaged from said seat by rotating said rod may be moved longitudinally and without further rotary movement past said discharge spout.

This specification signed and witnessed this 19th day of February A. D. 1909.

HENRY GREELEY CORDLEY.

In the presence of—
GEORGE B. WILLIAMS,
WILLIAM M. REIS.

---

Copies of this patent may be obtained for five cents each, by addressing the "Commissioner of Patents, Washington, D. C."